United States Patent [19]

Cooksey et al.

[11] 3,733,524

[45] May 15, 1973

[54] DEGAUSSING CIRCUIT

[75] Inventors: John A. Cooksey, Kirkwood; James Anthony Fazio, Liverpool, both of N.Y.

[73] Assignee: The Singer Company, Binghamton, N.Y.

[22] Filed: Mar. 1, 1972

[21] Appl. No.: 230,715

Related U.S. Application Data

[63] Continuation of Ser. No. 147,428, May 27, 1971, abandoned.

[52] U.S. Cl. ....................317/157.5

[51] Int. Cl. ....................H01f 13/00

[58] Field of Search ....................317/157.5, 157.5 TV; 315/8

[56] References Cited

UNITED STATES PATENTS

| | | | |
|---|---|---|---|
| 3,274,452 | 9/1966 | Landes | 317/157.5 |
| 3,286,122 | 11/1966 | Dietch | 317/157.5 TV |
| 3,324,344 | 6/1967 | Norley | 317/157.5 TV |
| 3,333,143 | 7/1967 | Anrooy et al. | 317/157.5 TV |
| 3,344,307 | 9/1967 | Anrooy et al. | 317/157.5 TV |
| 3,356,889 | 12/1967 | Merkl et al. | 317/157.5 TV |
| 3,387,172 | 6/1968 | Simon | 317/157.5 TV |
| 3,404,307 | 10/1968 | Hayden | 317/157.5 TV |
| 3,433,993 | 3/1969 | Norley | 317/157.5 TV |
| 3,492,543 | 1/1970 | Muranaga | 317/157.5 TV |
| 3,582,721 | 6/1971 | Hoorn | 317/157.5 TV |

*Primary Examiner*—L. T. Hix
*Attorney*—Francis L. Masselle et al.

[57] ABSTRACT

A degaussing circuit having fast recovery time for use in television displays, particularly useful where the display is frequently moved and requires frequent degaussing. By using a parallel combination of two diodes and two capacitors in series placed between the source and the degaussing coil a current which is initially at a maximum but decreases towards zero as the capacitors charge is provided. Additional means provide for quick discharge of the capacitors for immediate reuse of the circuit and for a reduction of any leakage current.

11 Claims, 2 Drawing Figures

DEGAUSSING CIRCUIT

RELATED APPLICATIONS This application is a continuation of U.S. application Ser. No. 147,428 now abandoned.

BACKGROUND OF THE INVENTION

This invention relates to color television displays in general and more particularly to a degaussing circuit for use in such displays.

The conventional color television receiver or monitor has a degaussing circuit which comes on to degauss the tube and remove unwanted magnetic fields each time the set is turned on. The circuit uses a thermistor and varistor which, as the set heats up gradually, cause the degaussing current to decrease to zero. This works quite well for a basically stationary monitor or receiver. In such a situation degaussing at each turn-on is sufficient. If for some reason degaussing is required again, the degaussing circuit must be turned off and allowed to cool for 20 minutes or so.

In an application such as visual simulation where a color monitor is mounted on the cockpit of a simulator, which is in turn mounted on a motion system, the conventional degaussing circuit is not acceptable. Because of the movement the magnetic field will be affected and a loss of purity will occur quite frequently.

Since it is not always possible to wait while a conventional type degaussing circuit cools, a different type of degaussing circuit is required. In addition, the fields around a simulator and its associated motion system will be much more powerful than those in areas where a color monitor is usually found. Thus, a circuit with higher than normal current capability is also required.

SUMMARY

It is the principal object of the present invention to provide a degaussing circuit which has a short recovery time.

Another object is to provide such a circuit for use with a color television tube.

Another object is to provide such a circuit with relatively high current capability.

It is also an object to provide such a circuit in which the charging characteristics of a capacitor are used to effect a high initial current through a degaussing coil which gradually decreases.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings.

DESCRIPTION OF THE PREFERRED EMBODIMENT

Degaussing is used to get rid of unwanted magnetic fields. Its use in color television is important in that fields in the shadow mask of the color tube will cause a loss of color purity. The degaussing is accomplished by passing a high current through a coil encircling the portion of the color tube directly behind the face. The main requirement on the circuit which provides this current is that the current exists for at least 1 full cycle. Turning off at other than full cycle will cause unwanted fields to occur. Since it is not possible to accurately turn on current for exactly 1 full cycle, an alternate method is to slowly decrease current after one full cycle. Then when the current goes off, even if in midcycle, it will have little effect. This is essentially what happens in the conventional circuit.

Figure 1:
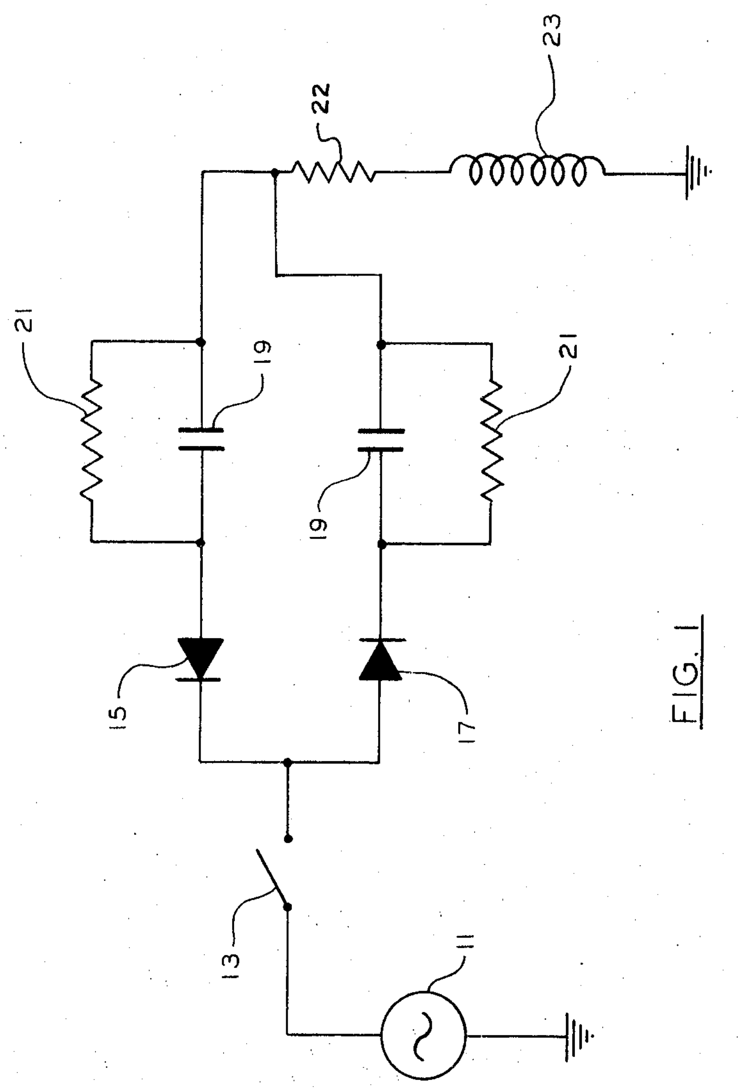
FIG. 1 is a schematic of a first embodiment of the degaussing circuit of the invention.

FIG. 1 shows a circuit which will accomplish this function, but will not require a cool down period. An AC source 11 is connected to a switch 13. The other side of switch 13 is connected to two diodes 15 and 17. It is connected to the anode of diode 17 and the cathode of diode 15. Connected to the other side of each of diodes 15 and 17 are capacitors 19 and 20, respectively, with resistors 21 and 22 across the respective capacitors. The other side of the two capacitors are tied together and connected to degaussing coil 23 through an optional resistor 22.

When degaussing is needed switch 13 is closed. Initially current will flow into coil 23 as if no components (other than resistor 22, if present) were between it and the switch. But as current continues to flow the voltage on capacitors 19 and 20 will increase until it reaches the value of the input voltage at which time current will become zero. The magnitude of current, then, will follow the charging curves of capacitors 19 and 20. When switch 13 is opened capacitors 19 and 20 will quickly discharge through resistors 21 and 22 which will be of a high enough value to prevent any appreciable current from passing when capacitors 19 and 20 are charged. Upon discharge the circuit is immediately ready for reuse. In some cases, depending on the tube being used, it may be necessary, in order to get complete degaussing, to apply the degaussing current for a period longer than the time constant of capacitor 19 and coil 23. In that case a resistor 22 may be inserted in series with the coil to lengthen the time constant.

Figure 2:
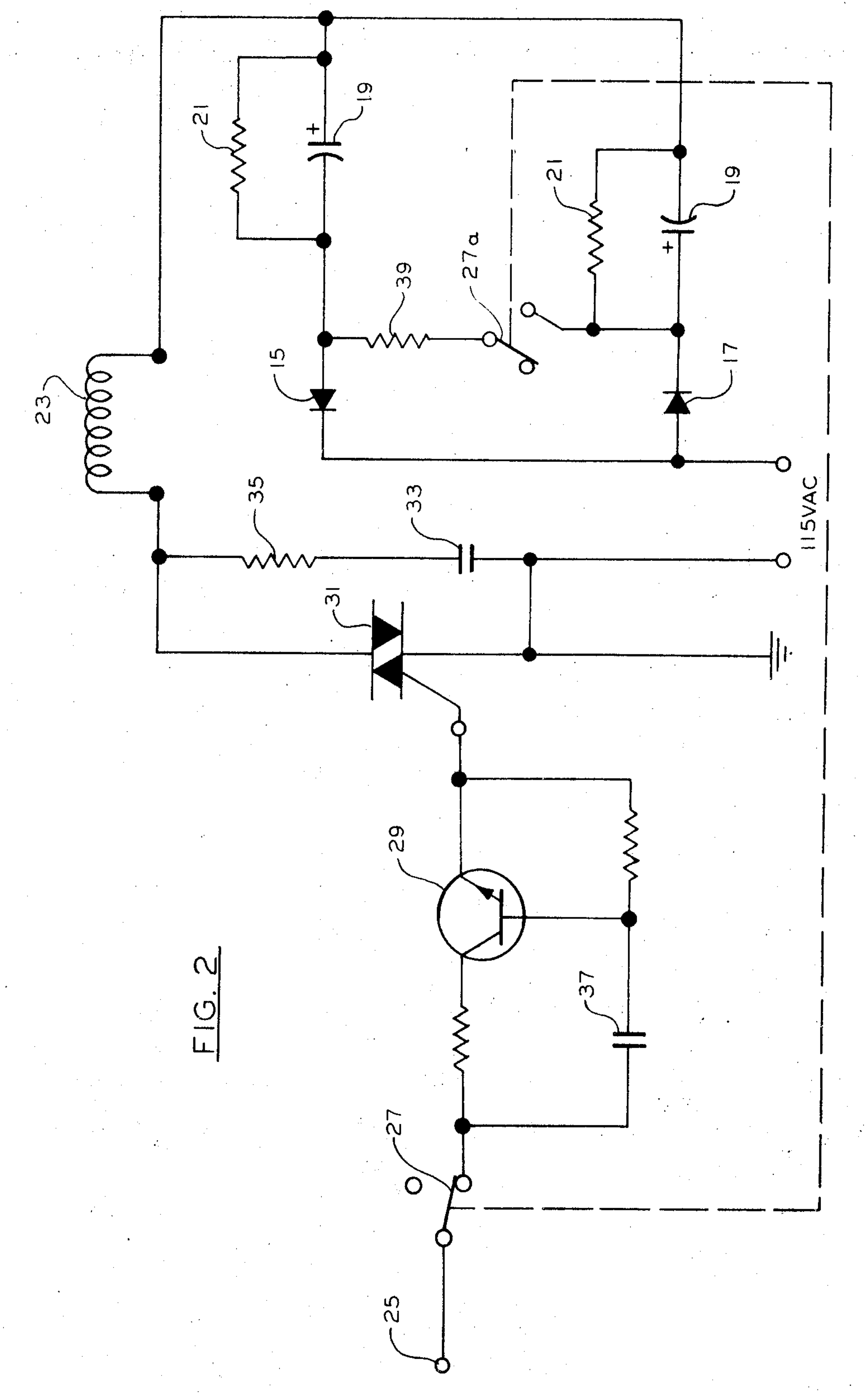
FIG. 2 is a circuit diagram of a second embodiment of the degaussing circuit.

A further refinement of the degaussing circuit is shown in FIG. 2. The small amount of leakage current which exists will cause some interference if the switch of FIG. 1 is left on. FIG. 2 shows an additional time delay circuit which will effectively cut off the current after degaussing.

Point 25 is tied to a DC power supply in the color television monitor. When monitor power is turned on, with switch 27 in the position shown, transistor 29 will conduct and triac 31 will conduct, allowing current to pass through the coil and the circuit elements described in the FIG. 1 embodiment for which common reference numerals are used in FIG. 2. A capacitor 33 and resistor 35 are placed across triac 31 for suppression in accordance with the manufacturer's recommendations.

As capacitor 37, connected to the base of transistor 29, charges it will turn off transistor 29. Thus, triac 31 will turn off, blocking current through coil 23. By this time the degaussing circuit will have performed its function.

To reuse the circuit switch 27 is momentarily moved to the opposite contact to allow capacitors 19 and 20 and capacitor 37 to discharge. The second portion 27*a* of switch 27 will at this time switch a resistor 39 between capacitors 19 and 20 to speed up discharge. The switch is then returned to the position shown to degauss again.

Thus, a degaussing circuit which may be operated repeatedly because of its fast recovery time has been shown. Although a particular application to color monitors in a simulator visual system has been described, it is equally useful in any applications where a color monitor is frequently moved and may also be used in degaussing applications apart from those in the color television field.

What is claimed is:

1. A circuit for placement between an alternating current source and a degaussing coil to control the current supplied to the coil comprising:

a. a first diode with its anode connected to one side of the source;

b. a first capacitor and first resistor in parallel connected on one side to the cathode of said first diode;

c. a second diode with its cathode connected to the source;

d. a second capacitor and second resistor in parallel connected on one side to the anode of said second diode and on the other side to the other side of said first capacitor and first resistor and to one side the degaussing coil; and e. a connection from the other side of said source to the other side of said degaussing coil.

2. The invention according to claim 1 and further including a resistor in series with said coil.

3. The invention according to claim 1 and further including a switch between said source and said first and second diodes.

4. The invention according to claim 1 wherein said degaussing coil is used to degauss a color television picture tube.

5. The invention according to claim 1 and further including means to substantially reduce the current available to said circuit at a predetermined time after current is first made available from said source.

6. The invention according to claim 4 wherein said means comprise:

a. a triac placed in the path between said source and said coil; and b. means to turn on said triac, and at a predetermined time after turn-on to turn off said triac.

7. The invention according to claim 5 wherein said means to turn said triac on and off comprise:

a. a transistor having its output connected to control said triac such that when said transistor is on said triac will be on; and b. means to turn said transistor on and to turn said transistor off at a predetermined time after turn-on.

8. The invention according to claim 6 wherein said means to turn said transistor on and off comprise;

a. means to provide a voltage to said transistor;

b. biasing means in the base circuit of said transistor including a third capacitor arranged so that on application of a voltage said transistor will turn on and, after a predetermined time controlled by the time constant of said biasing means, will turn off.

9. The invention according to claim 7 wherein said means to apply voltage is a first two-position switch connecting said transistor to a DC voltage source when in a first position.

10. The invention according to claim 8 and further including a second switch, paralleled with said first switch, connected on one side to the one side of said first capacitor and resistor and on the other side to one side of a third resistor, said third resistor connected on the other side to said one side of said second capacitor and resistor, said second switch being open when said first switch is in said first position and closed when said first switch is in a second position.

11. The invention according to claim 9 wherein said circuit is used in a color television display and said DC voltage source is on when said display is on whereby turning said display on with said first switch in said first position will cause said display to be degaussed.

* * * * *

UNITED STATES PATENT OFFICE
CERTIFICATE OF CORRECTION

Patent No. 3,733,524 Dated May 15, 1973

Inventor(s) John A. Cooksey et al

It is certified that error appears in the above-identified patent and that said Letters Patent are hereby corrected as shown below:

Column 2, line 51, after "supply" insert --(not shown)--.
Column 3, line 22, after "to" insert --said one side of--.
Column 4, line 2, "4" should be --5--;
line 8, "5" should be --6--;
line 15, "6" should be --7--;
line 17, after ";" insert --and--;
line 23, "7" should be --8--;
line 27, "8" should be --9--; and
line 36, "9" should be --10--.

Signed and sealed this 9th day of July 1974.

(SEAL)
Attest:

McCOY M. GIBSON, JR.
Attesting Officer

C. MARSHALL DANN
Commissioner of Patents

USCOMM-DC 60376-P69
☆ U.S. GOVERNMENT PRINTING OFFICE : 1969 O—366-334